United States Patent [19]
Drewel et al.

[11] Patent Number: 5,078,584
[45] Date of Patent: Jan. 7, 1992

[54] BLADDERLESS TIRE-CURING PRESS

[75] Inventors: Günter Drewel, Seevetal; Horst Enoch; Klaus Grotkasten, both of Hamburg, all of Fed. Rep. of Germany

[73] Assignee: Krupp Maschinentechnik Gesellschaft mit Beschrankter Haftung, Essen, Fed. Rep. of Germany

[21] Appl. No.: 648,153

[22] Filed: Jan. 30, 1991

[30] Foreign Application Priority Data

Feb. 5, 1990 [DE] Fed. Rep. of Germany ....... 4003413

[51] Int. Cl.$^5$ .............................................. B29C 35/00
[52] U.S. Cl. ...................................... 425/28.1; 425/36; 425/47; 425/54
[58] Field of Search .................... 425/36, 47, 54, 28.1

[56] References Cited

U.S. PATENT DOCUMENTS

| | | | |
|---|---|---|---|
| 3,171,162 | 3/1965 | Soderquist | 425/36 |
| 3,467,989 | 9/1969 | Youngblood et al. | 425/36 |
| 4,245,971 | 1/1981 | MacMillan | 425/47 |
| 4,758,401 | 7/1988 | Rasch et al. | 264/326 |
| 4,768,937 | 9/1988 | Singh | 425/36 |

FOREIGN PATENT DOCUMENTS

| | | |
|---|---|---|
| 2228504 | 2/1972 | Fed. Rep. of Germany . |
| 3242241 | 5/1984 | Fed. Rep. of Germany . |
| 3246624 | 4/1987 | Fed. Rep. of Germany . |
| 3918209.3 | 6/1989 | Fed. Rep. of Germany . |

Primary Examiner—Willard E. Hoag
Attorney, Agent, or Firm—Herbert Dubno

[57] ABSTRACT

A bladderless tire-curing press has upper and lower pressing disks cooperating with upper and lower bead rings. The pressing disks have circumferentially continuous outer surfaces engaging the beads and bounded inwardly by axial projections with conical centering surfaces which engage in recesses in the bead rings. The bead rings have projections engaging in grooves between the projections of the disks.

8 Claims, 5 Drawing Sheets

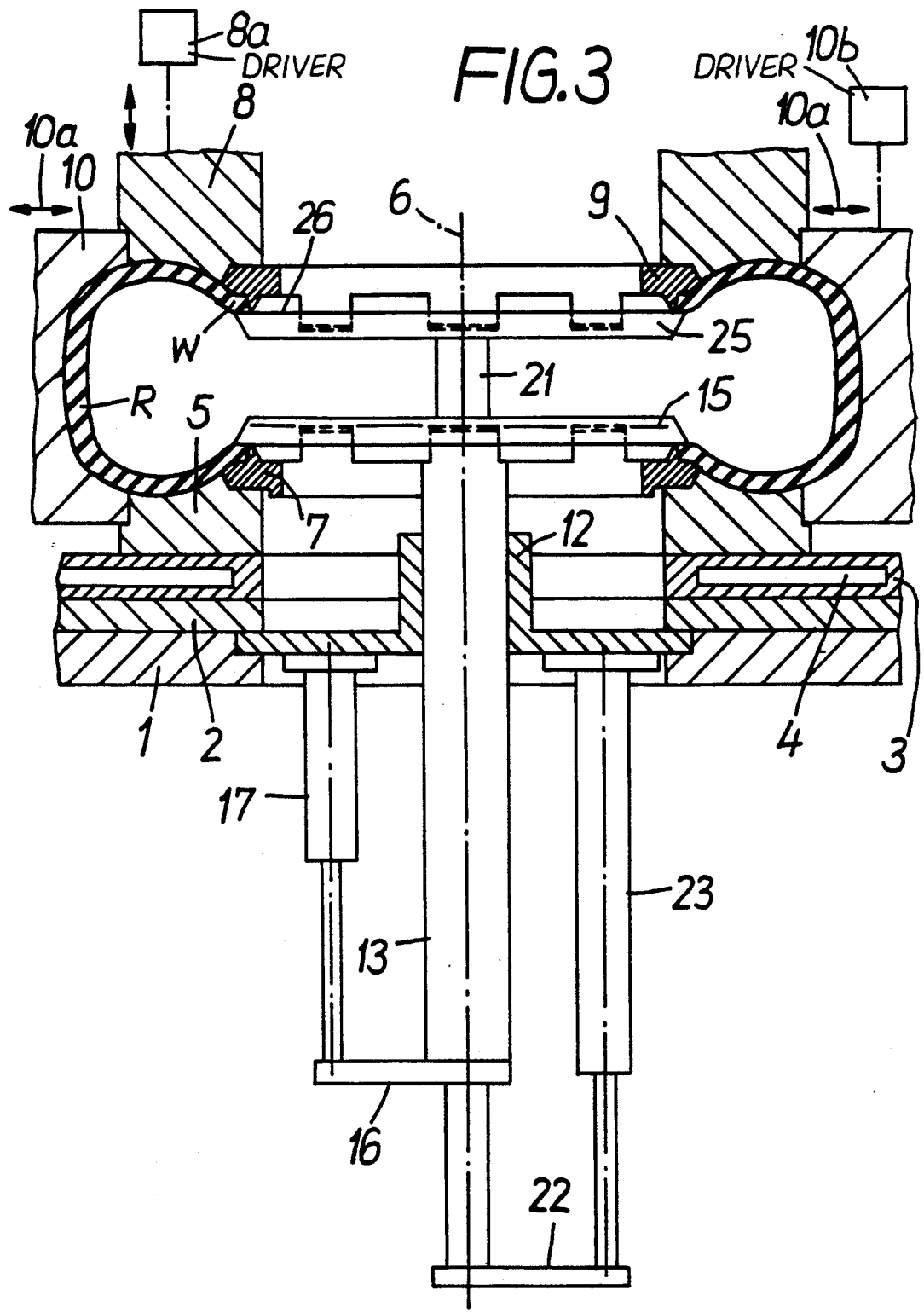

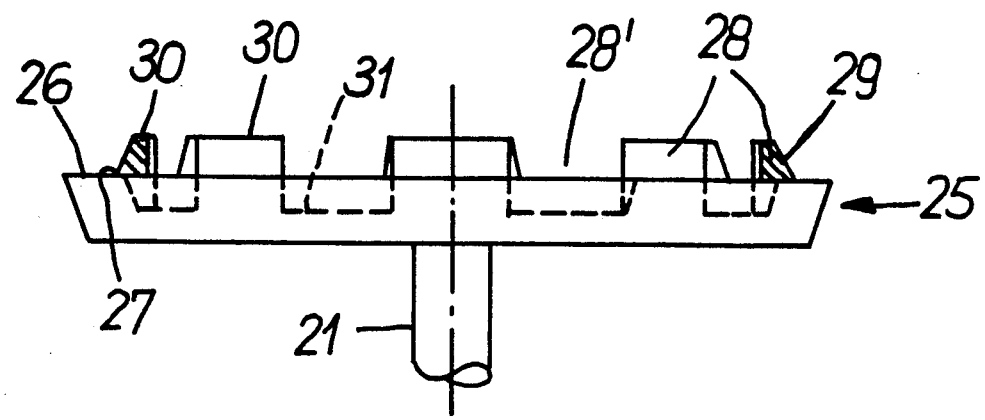
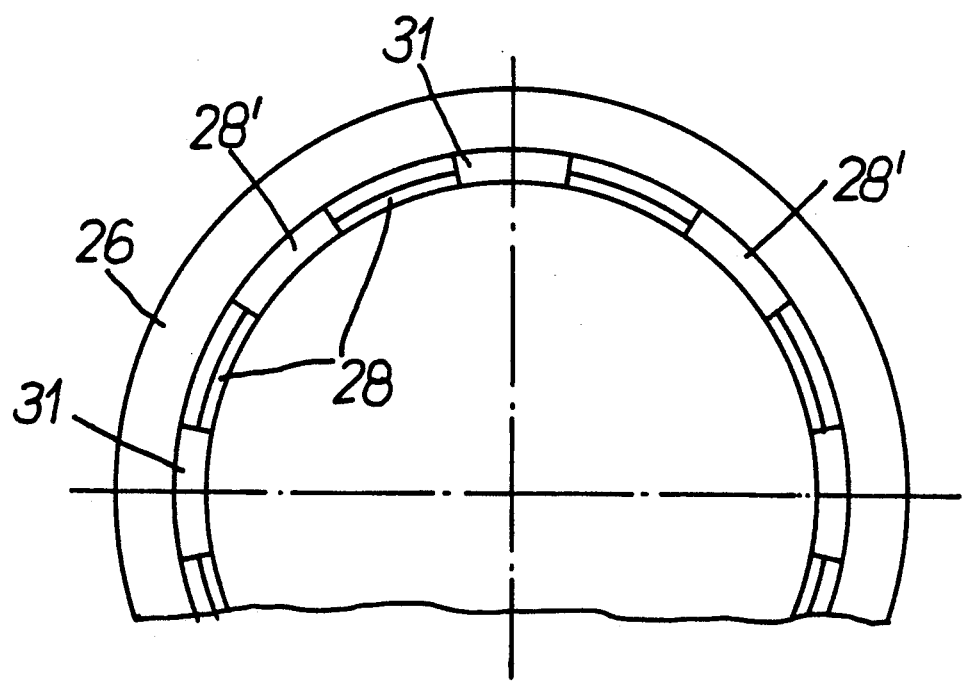

BLADDERLESS TIRE-CURING PRESS

FIELD OF THE INVENTION

Our present invention relates to a bladderless tire-curing press or tire-vulcanization press, wherein upper and lower members mechanically press the green tire carcass against upper and lower bead-forming tools or members which, together with a segmental outer member, impart the external profile to the tire body during the curing and vulcanization operation.

BACKGROUND OF THE INVENTION

In the prior bladderless tire-curing press described in the European patent document 0 022 350, the members used to press the tire carcass against the bead-forming tools are constituted by a multiplicity of circumferentially uniformly spaced gripper arms which can be controlled in movement in the vertical and radial directions and which press segments of a segmented ring against the inner portions of the bead of the tire carcass to press, in turn, the tire carcass against the outer bead-forming members.

This tire-curing press has the drawback that the pressing surfaces on the gripper arms, because of their segmented configuration, are circumferentially discontinuous.

Another disadvantage is that the large number of pivots and control elements required for the pressing members and the camming surfaces which must be executed with considerable precision, are detrimentally affected by the heating medium with which they are in prolonged contact. As a consequence, the maintenance time and costs are elevated in such systems and production losses may be suffered when the joints or surfaces fail.

In German open application 2 228 504, a vulcanization press is described in which the bead of the carcass is engaged between the plates located within the carcass and a pair of body-forming dies. The plates have planar surfaces juxtaposed with the body-forming dies.

In German patent document P39 28 209, a system for charging a green carcass into a tire-vulcanization press is described in which the tire carcass can be tilted to fit over the pressing members of this press.

A vulcanization press for pneumatic tires is also described in German patent document 32 42 241 in which the outer tools forming the tire carcass cooperate with a pair of disks or plates having conically beveled surfaces engageable with the bead-forming tools.

German patent document 32 46 624 also relates to the construction of a tirevulcanization press and the bead-forming structures thereof.

Finally we may mention U.S. Pat. No. 4,758,401 which discloses a bead-forming structure located wherein the tire carcass and which has radially displaceable members.

OBJECTS OF THE INVENTION

It is the principal object of the present invention to provide a tire-curing press which extends the principles of the tire-curing press of European patent document 0 022 350 but which eliminates pivot joints and camming surfaces sensitive to attack by the heating medium in this earlier system.

Another object of this invention is to provide an improved tire-curing press in which drawbacks of segmented pressing elements are avoided.

Still another object of our invention is to provide an improved bladderless tire-vulcanization press in which disadvantages of the tire-curing processes described above are eliminated and the useful life of the press is increased.

SUMMARY OF THE INVENTION

These objects and others which will become apparent hereinafter are attained, in accordance with the invention in a bladderless tire-curing press which comprises:

a lower bead-shaping member;

an upper bead-shaping member spaced above and coaxial with the lower bead-forming member;

an outer segmental tire-body-shaping member positionable with the upper and lower bead-shaping members to form an exterior of a green tire carcass into outer surfaces of a vulcanized tire body;

a lower pressing disk juxtaposed and coaxial with the lower bead-shaping member, engageable with a lower bead of the carcass and having an outer diameter greater than a diameter of the lower bead, the lower pressing disk being movable axially relative to the bead-shaping members;

an upper pressing disk juxtaposed and coaxial with the upper bead-shaping member, engageable with an upper bead of the carcass and having an outer diameter greater than a diameter of the upper bead, the upper pressing disk being movable axially relative to the bead-shaping members and independently of axial movement of the lower pressing disk; and respective displacing means connected to the pressing disks for axially displacing same, the pressing disks each having an annular circumferentially continuous pressing surface radially overhanging and axially juxtaposed with a pressing surface of the respective bead-shaping member, each of the pressing disks further having at least one axial projection having in axial view at least a circular arc-segmental configuration inwardly bounding the respective annular circumferentially continuous pressing surface and formed with a conical outer surface, the bead-shaping members having respective recesses complementary to the projections and receiving same in a closed position of the press.

It is, therefore, important to the invention that the upper and lower pressing disks, constituting the countertools which cooperate with the bead-shaping members or tools described, be:

movable axially independently from one anther, provided with an outer diameter which is larger than the inner diameter of the green carcass, formed with circumferentially continuous annular or ring-shaped pressing surfaces juxtaposed with the respective bead-forming tool, and provided with axially-extending projections which are disposed in a circle, having conical outer surfaces engageable with conical surfaces of the respective bead-forming tools and receivable in recesses therein. The circular pattern of these projections can be seen in a plan view of the countertools or disks, i.e. in an axial projection thereof.

The countertool can thus be reduced to two pressing disks which can be affixed in a simple manner on telescopingly interconnected rams. Pivot joints are eliminated entirely so that a major reason for breakdown of the tire-curing press, namely, the attack on the pivot joints by the heating medium, is eliminated. The operating life of the press is correspondingly increased.

The circular pressing surfaces have no interruptions along their peripheries and thus have no opportunity to nonuniformly engage the bead of the carcass or to generate irregularities thereon.

It is especially important that the uninterrupted circular pressing surfaces provide a good seal against the bead portion of the carcass. The conical surfaces of the projections ensure effective centering upon positioning of the green carcass on the upper pressing ring and, in conjunction with the contour of the bead-forming tools or members, an exact centering of all of the parts prior to the final pressing operation.

According to a feature of the invention, the projections of the pressing disks and the recesses in the bead-forming members receiving them are circular arc segmental in configuration and circumferentially equispaced, the gaps between the projections in the disks forming grooves into which projecting parts of the bead-forming tools can engage.

The segmental configuration of the projections of the disks, alternating with grooves receiving projections of the bead-forming members, provides a highly effective final centering action. With a conical configuration of the portion of the contour of the bead-forming members, the provisions of such projections ensures a smaller end diameter of the conical surfaces, providing an improved engagement of the bead upon emplacement of the bead against the bead-shaping member and thus a more reliable centering of the bead before the pressing thereof.

BRIEF DESCRIPTION OF THE DRAWING

The above and other objects, features and advantages of the present invention will become more readily apparent from the following description, reference being made to the accompanying drawing in which:

FIG. 3 is a view similar to FIG. 1 in the heating and vulcanization position;

FIG. 4 is a plan view of the upper pressing disk;

FIG. 5 is a side view partially in section of the upper pressing disk;

SPECIFIC DESCRIPTION

Figure 1:
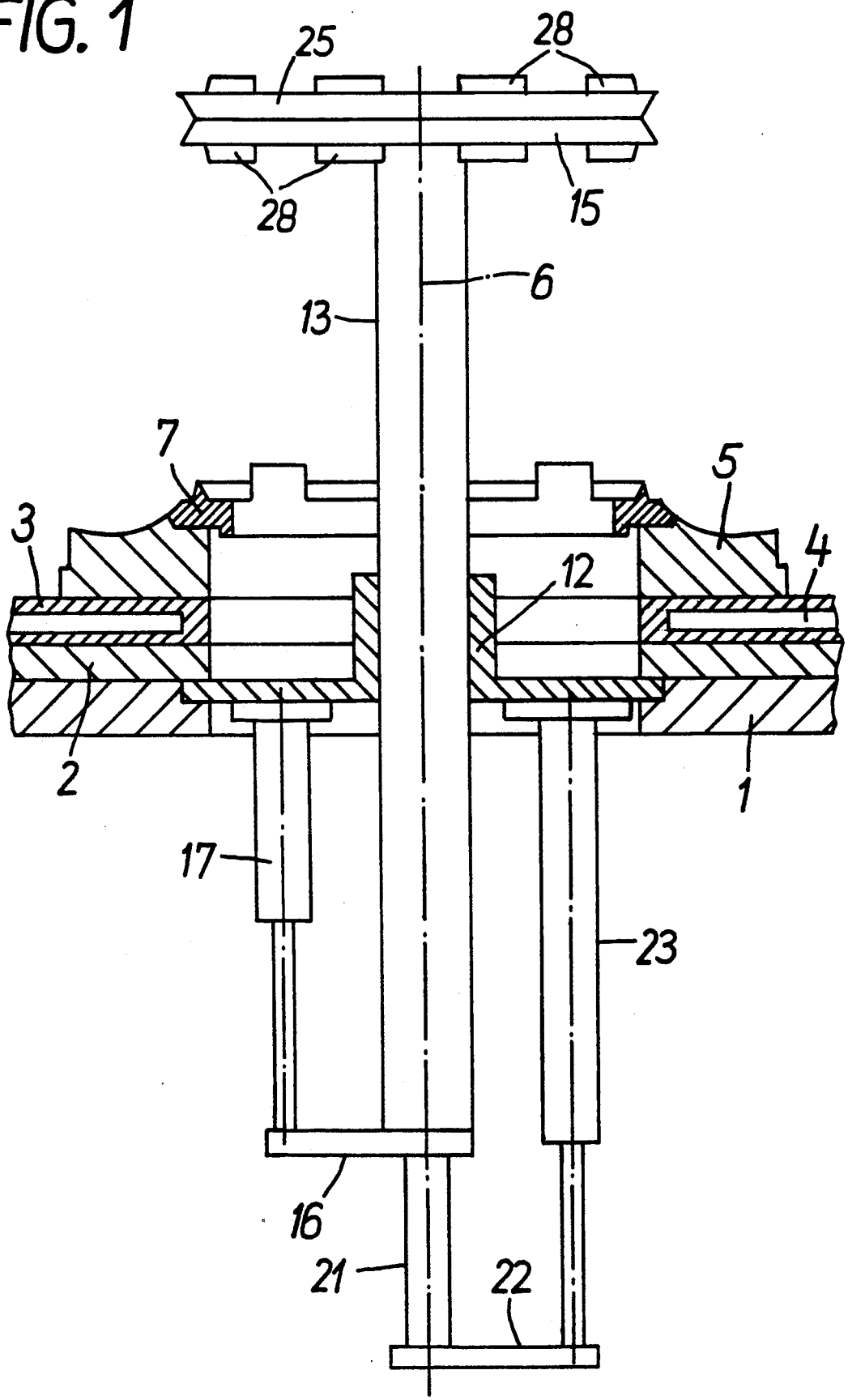
FIG. 1 is a partial vertical section of portions of the tire-curing press of the invention in the position before the insertion of a green carcass into the press.
Figure 2:
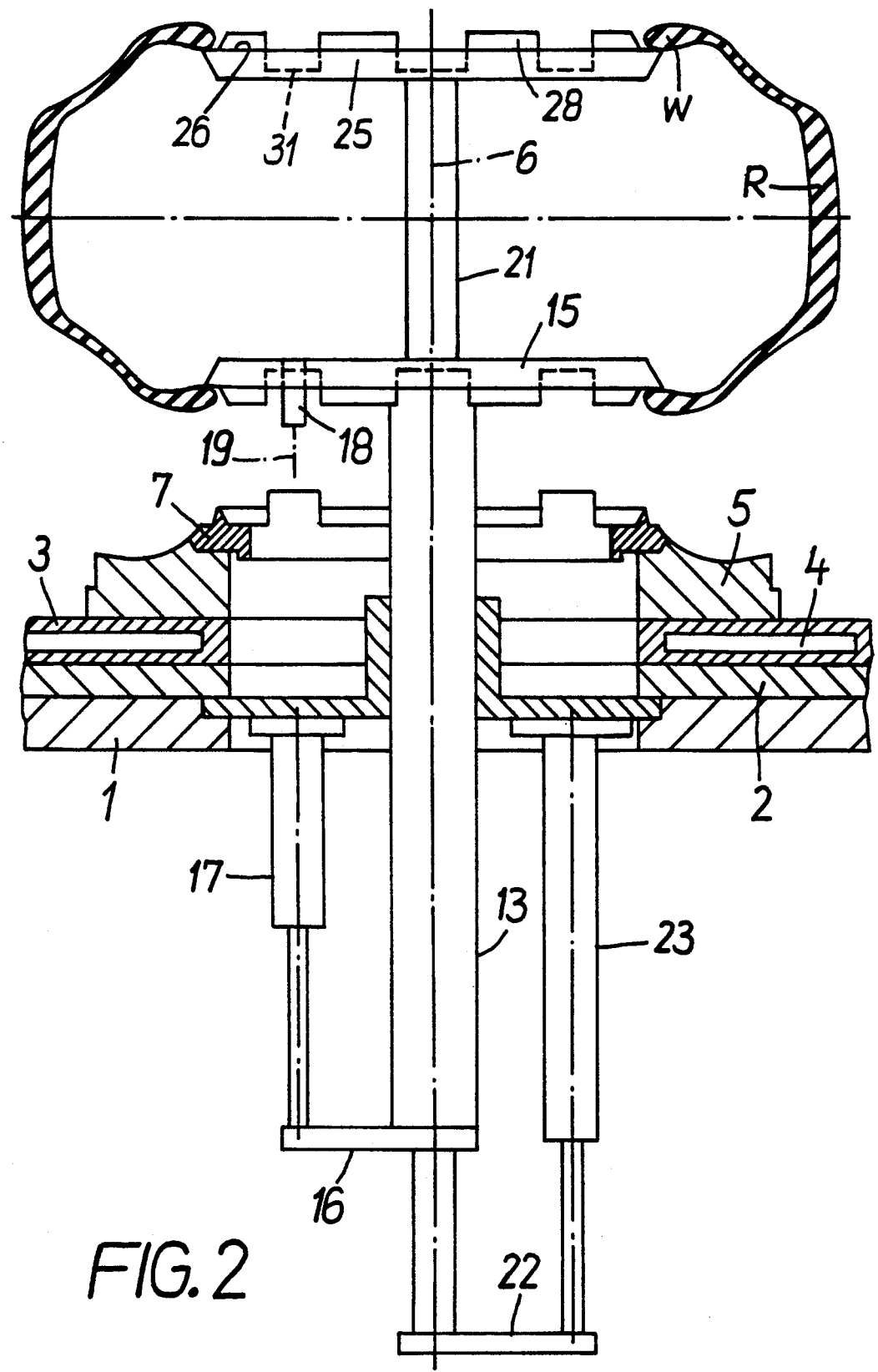
FIG. 2 is a view similar to FIG. 1 in the precentering position.

As can be seen from FIGS. 1-3, the tire-curing press diagrammatically illustrated in the drawing comprises a press plate 1 carrying a thermal insulation plate 2 and a heating plate 3 with passages 4 through which the heating medium is fed to the press.

To receive a green tire carcass R, the heating plate carries a lower ring-shaped bead-forming member, tool or shell 4 which is fixed on the plate 3 and has, surrounding the common axis 6 of the press, a lower bead-forming ring or bead ring 7.

Correspondingly, an upper bead-forming member 8 (FIG. 3) displaceable by a driver 8a in the vertical direction, is provided coaxially with the bead-forming member 5 and has a corresponding upper bead ring 9 at the upper part of the tire-curing press.

The desired configuration of the tire body is imparted to the carcass by the members 5 and 8 and an outer die 10 of segmented construction, the segments being radially displaced in a conventional manner as represented by the arrows 10a by drivers, one of which is shown at 10b. These drivers can be articulated arms or the like since the pivots thereof are located outside the region of attack of the heating medium.

In the pressing table 1, we provide a guide 12 in which a tubular outer ram 13 is slidable axially. This ram 13 is formed at its upper end with a lower pressing disk 15.

A traverse 16 is connected to the lower end of the ram 13 and is actuated by a hydraulic cylinder 18 to raise and lower the lower pressing disk 15. The lower pressing disk 15 has a downwardly-extending fitting 18 which can be connected by a pipe or hose represented only diagrammatically at 19 to a source of the heating medium not otherwise illustrated.

Within the tubular ram 13, a cylindrical inner ram 21 is slidable. The ram 21 is connected by a traverse 22 with a hydraulic cylinder 23. At its upper end, the ram 21 carries an upper pressing disk 25 juxtaposed with the upper bead ring 9.

The upper pressing disk 25 is provided along its periphery with a circumferentially continuous ring-shaped pressing surface 26 which is shaped to conform to the inner surface of the upper bead W of the green tire carcass and serves to receive its upper bead and to press it against the upper bead ring 7 for vulcanization.

The pressing surface 26 and thus the pressing disk 25 as a whole has an outer diameter which is greater than the inner diameter of the bead W. The lower disk 15 is similarly dimensioned with respect to the lower bead of the tire carcass and has a circumferentially continuous pressing surface adapted to bear upon the lower bead.

The cooperation of the lower disk 15 with its bead-forming member 5 is identical to the cooperation of the upper disk 25 and its bead-forming member 8 so that the description below that reference to the upper disk 25 will be understood to be applicable to the lower disk 15 as well.

Along the inner edge 27 of the pressing surface 26, a number n, for example 8, of axial projections 28 are provided, these projections being of circular arc segmental configuration and lying along a circular pattern as seen in plan view.

Each occupies $\frac{1}{2}$n, of the circumference of the ring of projections. The projections 28 have conical outer surfaces 29 and abutment surfaces 30 parallel to the pressing surface 26. Between the projections 28 there are gaps 28' at which the disk 15 is formed with grooves or channels 31.

Figure 7:
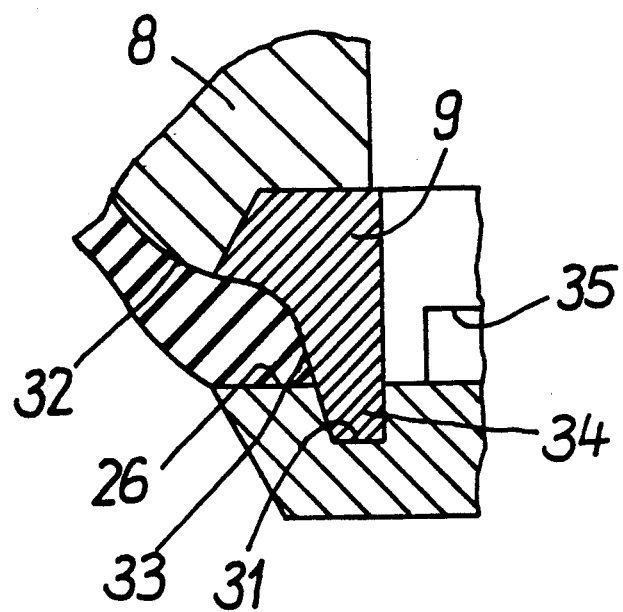
FIG. 7 is a view similar to FIG. 6 of a part of the member and disk in which the pressing ring of the member has a projection engaged in a groove of the disk between axial projections thereof.

The upper bead-forming ring 9 has an outer contour corresponding to the configuration to be imparted to the tire bead W in the form of a forming surface 32 with a downwardly-extending conical surface 33. The conical surface 33 is extended by projections 34, each having an arc length of ½n of the circumference of the projection ring previously described so as to engage in the corresponding grooves 31 of the pressing disk 25 (see FIG. 7).

Figure 6:
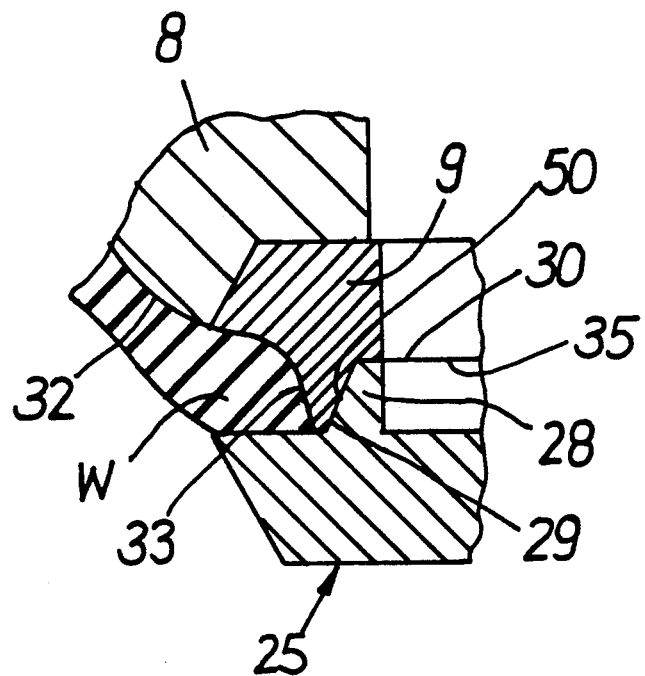
FIG. 6 is a detail view drawn to a larger scale of a portion of the upper disk and the upper bead-shaping member showing engagement of a projection of the disk in a recess of a pressing ring forming part of that member.

Between the projections 34, the bead ring 9 is formed with pockets or recesses 35 in which the projections 28 of the disk 2 can engage. These pockets 25 are shaped complementarily to the projections 28 and have abutment surfaces engaging the abutment surfaces 30 of these projections and surfaces 50 which are conical and engage the surfaces 29 (FIG. 6).

The upper and lower pressing disks 25, 15 and the upper and lower bead rings 9, 7 are respectively of identical configuration.

To charge the press with a green tire carcass R, the upper bead-shaping member 8 with its upper bead ring 9 is moved upwardly and the segmented die 10 is moved radially outwardly. The two pressing disks 15, 25 are raised to an intermediate level between the separated members 5, 7 and 8, 9 and are held against one another (FIG. 1).

In this position, the tire carcass R is stretched to form an oval and the lower bead is pressed over the disks 15, 25 in a so-called overbuttoning operation and by rotation of the carcass, the upper bead is caused to come to rest upon the upper pressing disk 25 while the lower bead lies below the lower pressing disk 15 as is, for example, disclosed in German patent document 39 18 209. The projections 28 with their outer conical surfaces 29 serve to precenter the carcass on the circumferentially continuous pressing surface 26.

The lower pressing disk 15 is then separated from the upper pressing disk to bring the assembly into the position shown in FIG. 2 in which the carcass is held under a slight pretension so that the lower bead is correspondingly precentered.

While maintaining the spacing between these disks, the carcass is lowered until the projections 28 of the lower pressing disk 15 abut with their surfaces 30 in the recesses 35 of the bead ring 7 and the projections 34 of the bead ring project into the grooves 31 of the disk 15. With the lower bead W in its final pressed form and a good seal between the lower disk 15 and the lower bead, the lower bead is in position. Because of the mutual interengagement of the surfaces 29 and 33 of the projections 28 of the disk and the bead ring 7, before the lower bead is pressed, it is precisely centered.

The upper member 8 is then lowered and the inclined surfaces 39 of the upper pressing disk 25 and the bead ring 9 effects precise centering of the upper bead in the same manner and clamp the upper bead. The segmented die 10 is displaced radially inwardly. The pressing forces are then applied by the disks against the upper and lower beads and the bead rings 9 and 7 and the heating medium can be introduced.

The press is opened by inverse movement of the elements described.

We claim:

1. A bladderless tire-curing press, comprising:
a lower bead-shaping member;
an upper bead-shaping member spaced above and coaxial with said lower bead-forming member;
an outer segmental tire-body-shaping member positionable with said upper and lower bead-shaping members to form an exterior of a green tire carcass into outer surfaces of a vulcanized tire body;
a lower pressing disk juxtaposed and coaxial with said lower bead-shaping member, engageable with a lower bead of said carcass and having an outer diameter greater than a diameter of said lower bead, said lower pressing disk being movable axially relative to said bead-shaping members;
an upper pressing disk juxtaposed and coaxial with said upper bead-shaping member, engageable with an upper bead of said carcass and having an outer diameter greater than a diameter of said upper bead, said upper pressing disk being movable axially relative to said bead-shaping members and independently of axial movement of said lower pressing disk; and
respective displacing means connected to said pressing disks for axially displacing same,
said pressing disks each having an annular circumferentially continuous pressing surface radially overhanging and axially juxtaposed with a pressing surface of the respective bead-shaping member,
each of said pressing disks further having at least one axial projection having in axial view at least a circular arc-segmental configuration inwardly bounding the respective annular circumferentially continuous pressing surface and formed with a conical outer surface,
said bead-shaping members having respective recesses complementary to said projections and receiving same in a closed position of the press.

2. The tire-curing press defined in claim 1 wherein each of said pressing disks is formed with a plurality of angularly equispaced circular arc segmental axial projections having gaps between them receiving axial projections formed on the respective bead-shaping members between said recesses.

3. The tire-curing press defined in claim 2 wherein said gaps are extended by grooves in said disks between axial projections thereof and receiving the projections of the respective bead-shaping members.

4. The tire-curing press defined in claim 3 wherein said displacing means connected to said pressing disks for axially displacing same includes a pair of telescoping rams.

5. The tire-curing press defined in claim 4 wherein each of said rams is connected to a respective fluid-operated cylinder for axially displacing the respective disk.

6. The tire-curing press defined in claim 5 wherein an outer one of said rams is connected to said lower disk and an inner one of said rams extends through said outer one of said rams and is connected to said upper disk, each of said rams is formed with a traverse below said lower member, and said cylinders extend parallel to said rams and are respectively connected to said traverses.

7. The tire-curing press defined in claim 6 wherein said rams are coaxial with said members and said disks.

8. The tire-curing press defined in claim 7 wherein each of said members is provided with a bead-forming ring having a lip projecting toward the respective annular circumferentially continuous pressing surface of the disk juxtaposed therewith.

* * * * *